(12) United States Patent
Gupta et al.

(10) Patent No.: US 8,706,128 B2
(45) Date of Patent: *Apr. 22, 2014

(54) METHOD AND APPARATUS FOR MANAGING FREQUENCIES USED BY DEVICES

(71) Applicant: CenturyLink Intellectual Property LLC, Denver, CO (US)

(72) Inventors: Shekhar Gupta, Lower Gwynedd, PA (US); Carl M. Coppage, Bolivar, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,352

(22) Filed: Jun. 4, 2013

(65) Prior Publication Data

US 2013/0273929 A1 Oct. 17, 2013

Related U.S. Application Data

(63) Continuation of application No. 12/254,600, filed on Oct. 20, 2008, now Pat. No. 8,478,282.

(51) Int. Cl.
*H04W 72/00* (2009.01)

(52) U.S. Cl.
USPC ....... 455/450; 455/63.1; 455/67.13; 455/501; 455/509; 455/556.2; 455/41.2; 455/114.2; 370/342; 370/348; 375/346; 375/375

(58) Field of Classification Search
USPC ......... 455/450, 63.1, 67.13, 501, 556.2, 41.2, 455/114.2, 509, 448; 370/341, 342, 348; 375/144, 375, 346
See application file for complete search history.

(56) References Cited

U.S. PATENT DOCUMENTS

| | | | |
|---|---|---|---|
| 7,269,151 B2 | 9/2007 | Diener et al. | |
| 7,408,907 B2 * | 8/2008 | Diener | 370/338 |
| 7,424,268 B2 * | 9/2008 | Diener et al. | 455/62 |
| 7,564,816 B2 * | 7/2009 | McHenry et al. | 370/329 |
| 7,606,193 B2 * | 10/2009 | McFarland et al. | 370/329 |
| 7,630,687 B2 * | 12/2009 | Madhavan et al. | 455/63.1 |
| 7,647,023 B2 * | 1/2010 | Grushkevich | 455/41.2 |
| 7,664,465 B2 * | 2/2010 | Shen et al. | 455/63.1 |
| 7,742,764 B2 * | 6/2010 | Gillig et al. | 455/434 |
| 7,769,050 B2 * | 8/2010 | Scherzer et al. | 370/480 |
| 7,801,099 B2 * | 9/2010 | Desai | 370/338 |

(Continued)

OTHER PUBLICATIONS

U.S. Appl. No. 12/254,600; Non-Final Rejection dated Sep. 7, 2012; 26 pages.
U.S. Appl. No. 12/254,600; Notice of Allowance dated Mar. 4, 2013; 15 pages.

(Continued)

*Primary Examiner* — Marceau Milord
(74) *Attorney, Agent, or Firm* — Swanson & Bratschun, L.L.C.

(57) ABSTRACT

The illustrative embodiments described herein are directed to a method and apparatus for managing frequencies used by devices. In one embodiment, the process detects a set of frequencies from a set of devices to form a set of assigned frequencies. The process may also detect a first frequency used by a first device. The process may determine whether the first frequency interferes with the set of assigned frequencies. The process may also identify an unassigned frequency for use by the first device in response to determining whether the first frequency interferes with the set of assigned frequencies.

34 Claims, 5 Drawing Sheets

(56) References Cited

U.S. PATENT DOCUMENTS

| | | | |
|---|---|---|---|
| 8,027,249 B2 * | 9/2011 | McHenry et al. | 370/221 |
| 8,055,204 B2 * | 11/2011 | Livsics et al. | 455/67.11 |
| 8,218,487 B2 * | 7/2012 | Eliezer et al. | 370/329 |
| 8,243,612 B2 * | 8/2012 | Bahl et al. | 370/252 |
| 8,478,282 B2 * | 7/2013 | Gupta et al. | 455/450 |
| 2010/0098200 A1 | 4/2010 | Gupta et al. | |

OTHER PUBLICATIONS

U.S. Appl. No. 12/254,600; Issue Notification dated Jun. 12, 2013; 1 page.

IEEE Standards 802.15.2; "Coexistence of Wireless Personal Area Networks with Other Wireless Devices Operating in Unlicensed Frequency Bands"; The Institute of Electrical and Electonics Engineers, Inc.; Aug. 28, 2003; 126 pages.

* cited by examiner

METHOD AND APPARATUS FOR MANAGING FREQUENCIES USED BY DEVICES

CROSS-REFERENCE TO RELATED APPLICATIONS

This application is a continuation of U.S. patent application Ser. No. 12/254,600, filed Oct. 20, 2008 by Shekhar X. Gupta et al. and entitled, "Method and Apparatus for Managing Frequencies Used by Devices", the entire disclosure of which is hereby incorporated by reference.

BACKGROUND OF THE INVENTION

1. Field of the Invention

The present invention relates generally to a method and apparatus for managing frequencies. More particularly, the present invention relates to a method and apparatus for managing frequencies used by devices.

2. Description of the Related Art

The ability to communicate wirelessly is becoming an increasingly common functionality of communication devices. Communication devices often transmit and receive data at a particular frequency. In addition, other types of devices can emit radiation at various frequencies. However, two or more frequencies that are used or emitted by two or more devices can interfere with one another, leading to performance degradation in at least one of the devices.

BRIEF SUMMARY OF THE INVENTION

To alleviate one or more of the existing problems with managing frequencies used by devices, the illustrative embodiments described herein are directed to a data processing system and, in particular, to a method and apparatus for managing frequencies used by devices. In one embodiment, the process detects a set of frequencies from a set of devices to form a set of assigned frequencies. The process may also detect a first frequency used by a first device. The process may determine whether the first frequency interferes with the set of assigned frequencies. The process may also identify an unassigned frequency for use by the first device in response to determining whether the first frequency interferes with the set of assigned frequencies.

Other objects, features, and advantages of the illustrative embodiments will become apparent with reference to the drawings and detailed description that follow.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
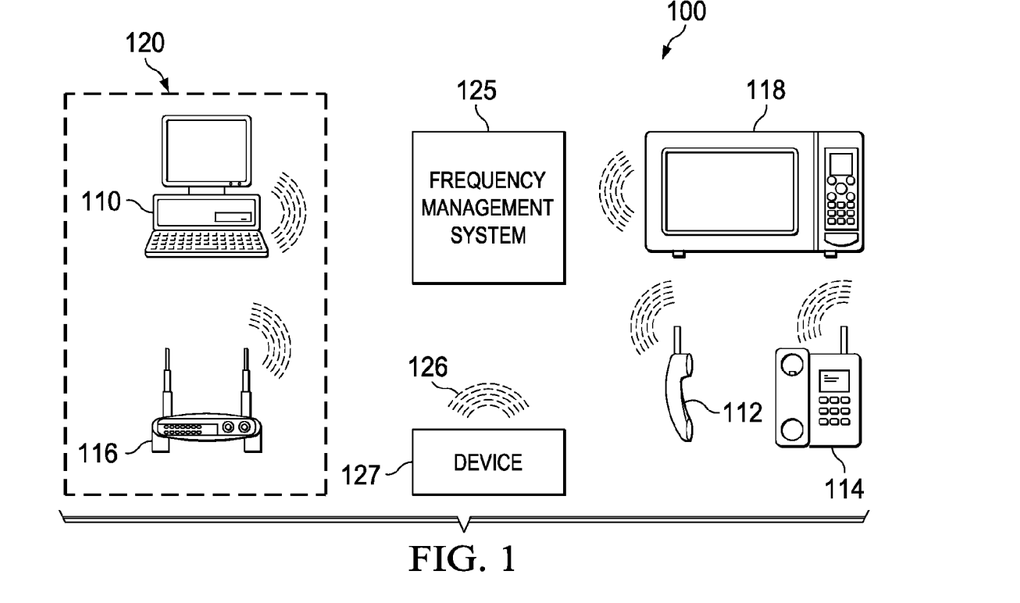
FIG. 1 is a pictorial representation of a network data processing system in which the illustrative embodiments of the present invention may be implemented.
Figure 2:
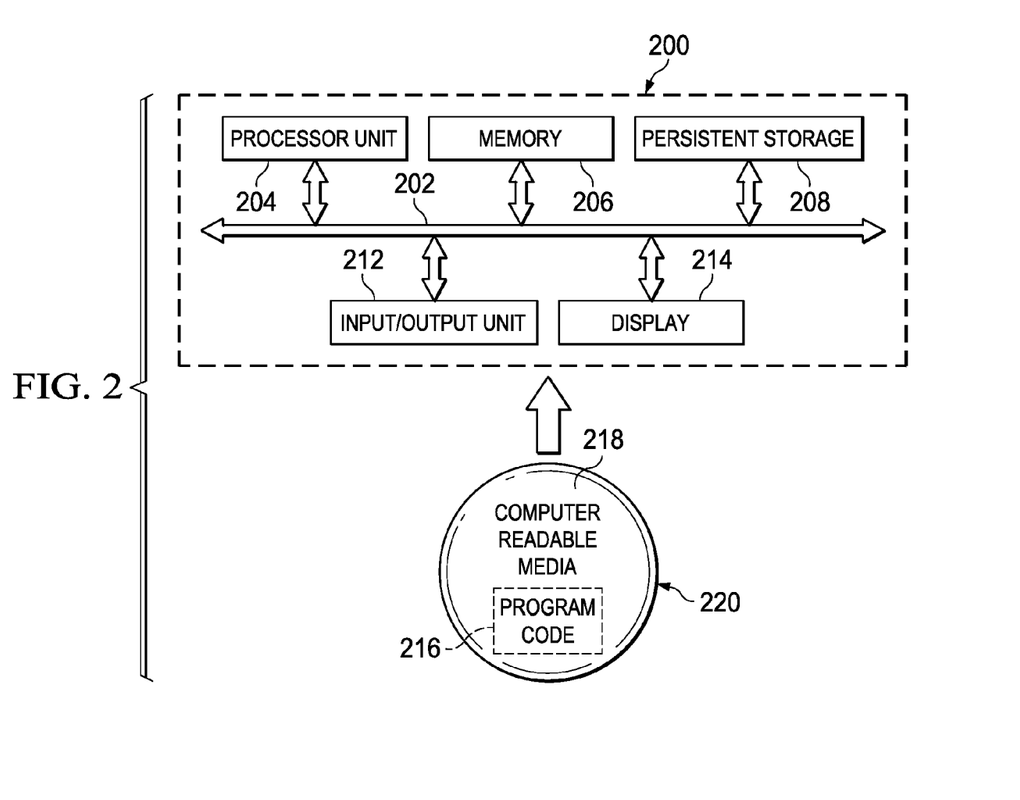
FIG. 2 is a schematic block diagram of a data processing system in which the illustrative embodiments of the present invention may be implemented.

With reference now to the figures and in particular with reference to FIGS. 1 and 2, diagrams of data processing environments are provided in which illustrative embodiments may be implemented. It should be appreciated that FIGS. 1 and 2 are only examples and are not intended to assert or imply any limitation with regard to the environments in which different embodiments may be implemented. Many modifications to the depicted environments may be made.

FIG. 1 shows a transmission environment 100 in which illustrative embodiments may be implemented. Radiation having any frequency may be transmitted through transmission environment 100. Also, transmission environment 100 may include any number of devices capable of emitting or receiving radiation at any frequency. In the non-limiting example of FIG. 1, transmission environment 100 includes computer 110, wireless phone 112, wireless phone base 114, wireless router 116, and microwave 118, each of which are capable of emitting or receiving radiation at particular frequencies.

All or a portion of the devices in transmission environment 100 may be communication devices, which are able to transmit or receive data at particular frequencies. For example, computer 110, wireless phone 112, wireless phone base 114, and wireless router 116 are communication devices that are able to transmit and receive data at particular frequencies. In this example, wireless phone 112 may be able to communicate with wireless phone base 114 at one or more frequencies. The communication between wireless phone 112 and wireless phone base 114 may include audio data, such as voice data. Also, computer 110 may be able to communicate with wireless router 116 at one or more frequencies. Any number of computers or other devices may receive data from and/or transmit data to wireless router 116. Computer 110 may be any type of computer, such as a laptop computer, a personal digital assistant, a desktop computer, and/or a computer accessory, such as a printer or scanner. Transmission environment 100 also includes microwave 118, which emits radiation at one or more frequencies. In this example, the radiation emitted by microwave 118 may or may not communicate data. The radiation from microwave 118 may be emitted as a result of cooking or another operation.

Numerous other types of devices that are capable of emitting or receiving radiation may be included in transmission environment 100. Non-limiting examples of the types of devices that may be included in transmission environment 100 include a garage door opener, a remote control, a home appliance, and/or a personal communication device. A device management system that manages the devices in an area, such as a home, office, or other location, using data transmissions at a particular frequency may also be included in transmission environment 100. For example, device management systems may manage the climate, security operations, and/or lighting for a particular area.

In one example, all or a portion of the devices in transmission environment 100 emit and/or receive radiation at frequencies within a particular frequency band, including one or more unlicensed bands. Non-limiting examples of unlicensed frequency bands that may be used by at least a portion of the devices in transmission environment 100 include a 6.765-6.795 megahertz band (centre frequency 6.780 megahertz), a 13.553-13.567 megahertz band (centre frequency 13.560 megahertz), a 26.957-27.283 megahertz band (centre frequency 27.120 megahertz), a 40.66-40.70 megahertz band (centre frequency 40.68 megahertz), a 433.05-434.79 megahertz band (centre frequency 433.92 megahertz), a 902-928 megahertz band (centre frequency 915 megahertz), a 2.400-2.500 gigahertz band (centre frequency 2.450 gigahertz), 5.725-5.875 gigahertz band (centre frequency 5.800 gigahertz), a 24-24.25 gigahertz band (centre frequency 24.125 gigahertz), a 61-61.5 gigahertz band (centre frequency 61.25 gigahertz), a 122-123 gigahertz band (centre frequency 122.5 gigahertz), or a 244-246 gigahertz band (centre frequency 245 gigahertz). In another embodiment, all or a portion of the devices in transmission environment 100 emit and/or receive radiation at frequencies within a licensed frequency band; in this embodiment, frequency management system 125 is used to manage frequencies within the licensed frequency band.

All or a portion of the devices in transmission environment 100 may be interconnected using a wireless local area network (WLAN), including WLANs that include a peer-to-peer network, bridge, or wireless distribution system. For example, wireless router 116 and any number of computers, such as computer 110, may be part of WLAN 120. All or a portion of the devices in transmission environment 100 may also be part of other types of networks, such as an Over the Air network, wireless personal area network (WPAN), intranet, wide area network (WAN), or any network able to facilitate wireless communication. FIG. 1 is intended as an example, and not as an architectural limitation for the different illustrative embodiments. In another example, transmission environment 100 may include a CDMA network, such as cdma-One or CDMA2000, that is used a facilitate communication between communication devices.

Radiation having a particular frequency that is emitted from any of the devices in transmission environment 100 may interfere with the operation of another device in transmission environment 100. For example, two or more devices in transmission environment 100 may emit radiation at frequencies within the same unlicensed frequency band, increasing the likelihood that such emissions may interfere with one another and effect the operation of at least one of the devices. Non-limiting examples of the effect of interference include a decrease in data throughput, loss of data, indecipherable communications, and an increase in network latency.

In one non-limiting example, computer 110, wireless router 116, wireless phone 112, and wireless phone base 114 each transmit and receive data using a frequency in an unlicensed frequency band, such as the 2.400-2.500 gigahertz band. In this example, emissions from any one of these devices, such as wireless router 116, can interfere with another one of these devices, such as wireless phone 112, operating in the same unlicensed frequency band, thereby causing a decrease in performance for at least one of these devices. Such interference may also be caused by devices performing operations having a purpose other than the transmission of data. For example, radiation emitted by microwave 118 may interfere with the frequency being used by computer 110, wireless router 116, wireless phone 112, and/or wireless phone base 114. In this example, if microwave 118 is too large or too close, the phone connection between wireless phone 112 and wireless phone base 114 and/or the data connection between computer 110 and wireless router 116 can drop or deteriorate. A user would then have to wait for the radiation-emitting operation of microwave 118 to finish or manually select a different frequency in the unlicensed frequency band for computer 110, wireless router 116, wireless phone 112, and/or wireless phone base 114. In one embodiment, transmission environment 100 may include an input/output device that keeps track of the radiation, including the frequency of the radiation, that is emitted by microwave 118. The input/output device may send data related to the radiation from microwave 118, such as frequency data, to frequency management system 125. The input/output device may be attached to, or otherwise in communication with, microwave 118. Such an input/output device may be used in conjunction with any of the devices described herein. Indeed, any device capable of emitting radiation, including those devices mentioned above, has the potential to interfere with any of the devices in transmission environment 100.

Transmission environment 100 also includes a frequency management system 125, which manages the frequencies used by the devices in transmission environment 100. In one embodiment, the frequency management system 125 detects a set of frequencies from a set of devices to form a set of assigned frequencies. The set of frequencies includes one or more frequencies. The set of devices includes one or more devices. The set of assigned frequencies includes one or more assigned frequencies. In the example of FIG. 1, the set of devices includes computer 110, wireless router 116, wireless phone 112, wireless phone base 114, and microwave 118. In this embodiment, the frequency management system 125 may also detect a frequency 126 used by device 127. In one embodiment, device 127 is not in the set of devices for which a set of frequencies have been detected to form the set of assigned frequencies. In this embodiment, device 127 is a device for which no frequency has been assigned. Device 127 may be any device, including any of the devices described above.

In one embodiment, frequency management system 125 determines whether frequency 126 interferes with an assigned frequency in the set of assigned frequencies. In this embodiment, the frequency management system 125 may identify an unassigned frequency for use by device 127 in response to determining whether frequency 126 interferes with an assigned frequency in the set of assigned frequencies. By identifying an unassigned frequency to be used by device 127, frequency management system 125 helps to ensure that none of the frequencies being used by the other devices in transmission environment 100 interferes with the frequency to be used by device 127.

In one illustrative embodiment, frequency management system 125 may be adapted for home usage. For example, each of the devices in transmission environment 100 may be devices typically used in a home, such as a kitchen appliance, phone, computer, home management system, and others. Also, frequency management system 125 may be adapted to manage frequencies in licensed or unlicensed frequency bands typically used in a home, such as an unlicensed frequency band having a range of 2.400 gigahertz to 2.500 gigahertz. As explained below, various factors, such as the type of home, may be weighed when determining interference or assigning frequencies.

With reference now to FIG. 2, a block diagram of a data processing system 200 is shown in which illustrative embodiments may be implemented. Data processing system 200 is an example of a computer and/or device in which computer-usable program code or instructions implementing the processes for the illustrative embodiments may be located. In one embodiment, frequency management system 125 in FIG. 1 is implemented in data processing system 200. Data processing system 200 includes communications fabric 202, which provides communications between processor unit 204, memory 206, persistent storage 208, input/output (I/O) unit 212, and display 214. Communications fabric 202 is an example of a bus system.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Memory 206 may store the assigned value of a variable. For example, memory 206 may contain the value given to a variable in a variable assignment. These values may also be contained in registers that are included in memory 206.

Input/output unit 212 allows for the input and output of radiation, including data, from and to other devices, such as the devices in transmission environment 100 in FIG. 1. For example, input/output unit 212 may include an antenna that is able to detect the frequency of radiation. In another example, input/output unit 212 may provide a connection for user input through a keyboard and mouse. Further, input/output unit 212 may send output to a printer.

In one embodiment, input/output unit 212 may detect a set of frequencies from a set of devices, such as computer 110, wireless router 116, wireless phone 112, wireless phone base 114, and microwave 118 in FIG. 1. Processor unit 204 may form a set of assigned frequencies using the set of frequencies that are detected from a set of devices. The set of assigned frequencies may be stored in memory 206 and/or persistent storage 208. Input/output unit 212 may also detect a frequency used by a particular device, such as frequency 126 from device 127 in FIG. 1. Processor unit 204 may determine whether this frequency interferes with an assigned frequency in the set of assigned frequencies. Processor unit 204 may also identify an unassigned frequency for use by the particular device in response to determining whether the frequency for the particular device interferes with an assigned frequency in the set of assigned frequencies. In one embodiment, this identified unassigned frequency may be added to the set of assigned frequencies and/or stored in the memory 206 and/or persistent storage 208.

In another embodiment, processor unit 204 may also identify the unassigned frequency in an unlicensed frequency band in response to determining that the frequency used by the particular device interferes with the set of assigned frequencies. In this embodiment, the unassigned frequency is different from the frequency used by the particular device. Also, input/output unit 212 may signal the particular device to use the unassigned frequency.

In another embodiment, processor unit 204 may identify the unassigned frequency to be the frequency used by the particular device in response to determining that the frequency used by the particular device does not interfere with the set of assigned frequencies. In any of these illustrative embodiments, the identified unassigned frequency may be added to the set of assigned frequencies and stored in the memory 206 and/or persistent storage 208.

Data processing system 200 may also include display 214, which may also act as a user interface. Display 214 provides a mechanism to display information to a user, as well as accept input from a user. For example, display 214 may be a touchscreen or LED screen through which a user may provide input.

Instructions for the operating system, application(s), and/or program(s) are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 and may be loaded onto or transferred to data processing system 200 for execution by processor unit 204. Program code 216 and computer-readable media 218 form computer program product 220 in these examples. In one embodiment, computer program product 220 is a computer program product for managing frequencies used by devices in accordance with an illustrative embodiment.

In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive or a flash memory that is connected to data processing system 200. The tangible form of computer-readable media 218 is also referred to as computer recordable storage media.

Alternatively, program code 216 may be transferred to data processing system 200 from computer-readable media 218 through a communication link, including a connection to input/output unit 212. The communication link and/or the connection may be physical or wireless in the illustrative examples. The computer-readable media also may take the form of non-tangible media, such as communication links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Further, a memory may be, for example, memory 206 or a cache, such as found in an interface and memory controller hub that may be present in communications fabric 202.

In one embodiment, data processing system 200, in which a frequency management system may be implemented, may be offered as a consumer device that may be used in the consumer's home. For example, data processing system 200 may be purchased or otherwise received by a customer and installed in the customer's home. The physical shape and/or design of data processing system 200 may facilitate usage in the home. For example, data processing system 200 may be wall-mountable, stackable/fittable on other devices, or otherwise designed for placement in a home environment.

Figure 3:
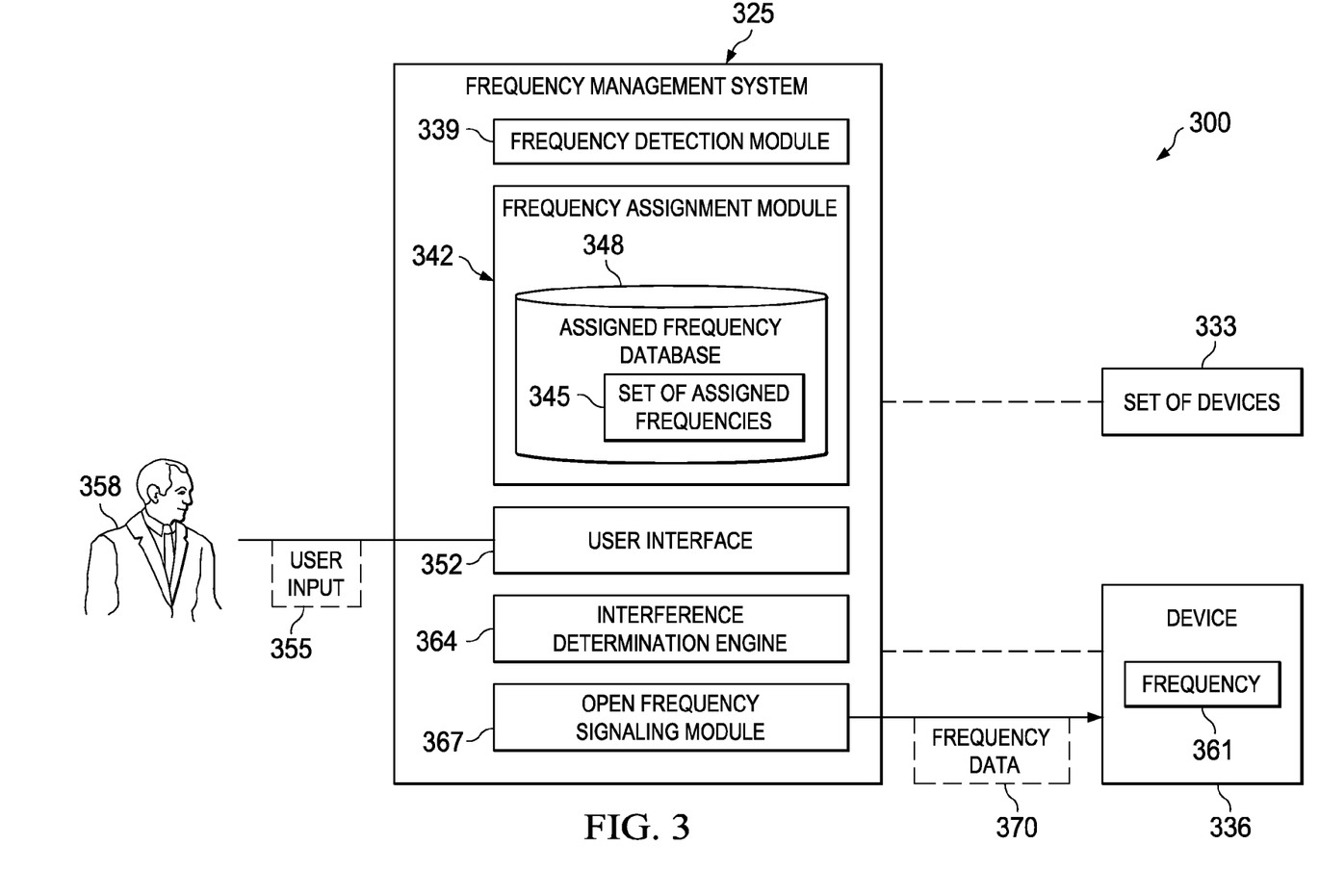
FIG. 3 is a schematic block diagram of a frequency management system for managing frequencies used by devices in accordance with an illustrative embodiment.

Turning now to FIG. 3, a data processing system 300 having a frequency management system 325 is shown according to an illustrative embodiment. Frequency management system 325 manages the frequencies being used by devices, including set of devices 333 and device 336. Frequency management system 325 is a non-limiting example of frequency management system 125 in FIG. 1. In one embodiment, frequency management system 325 may be implemented in data processing system 200 in FIG. 2.

Frequency management system 325 includes frequency detection module 339. Frequency detection module 339 detects a set of frequencies from set of devices 333. For example, at least a portion of the set of devices 333 may emit radiation and/or data at one or more frequencies that are detected by frequency detection module 339. Set of devices 333 may include any device capable of emitting radiation having a frequency, including any of the devices described herein. Upon detecting the set of frequencies from set of devices 333, frequency assignment module 342 may form set of assigned frequencies 345 from the set of frequencies that are detected from set of devices 333. In one embodiment, set of assigned frequencies 345 are in use, or otherwise originate, from set of devices 333, and each of the devices in set of devices 333 uses a respective assigned frequency in set of assigned frequencies 345. Set of assigned frequencies 345 may be stored in assigned frequency database 348. In one embodiment, assigned frequency database 348 may be located in a memory or persistent storage, such as memory 206 or persistent storage 208 in FIG. 2.

In another embodiment, user interface 352 may be used to add frequencies to set of assigned frequencies 345. In particular, user interface 352 may receive user input 355 from user 358. User input 355 may indicate a set of frequencies being used by set of devices 333 to form set of assigned frequencies 345. In one embodiment, user input 355 may also indicate a particular device within set of devices 333 that uses at least one frequency in set of assigned frequencies 345. In this way, each of the assigned frequencies in set of assigned frequencies 345 may be associated with a respective device in set of devices 333. For example, user input 355 may indicate that a wireless phone in set of devices 333 uses a particular frequency in an unlicensed frequency band. In this example, the particular frequency indicated by user input 355 may be added to set of assigned frequencies 345.

User interface 352 may be any user interface capable of receiving user input 355. For example, user interface 352 may be a panel and/or touchscreen having user-selectable buttons that may be used to provide input. User interface 352 may also include a display that shows user 358 data regarding frequency management system 325. For example, user interface 352 may display the frequencies in set of assigned frequencies 345 and the devices using each the assigned frequencies. User interface 352 may also be a separate data processing system, such as a computer, through which user input 355 is transmitted to frequency management system 325. In this example, the functionality and parameters in frequency management system 325 may be managed via the separate data processing system.

In one embodiment, set of assigned frequencies 345 may be determined solely through either of frequency detection module 339 or user interface 352. In another embodiment, both frequency detection module 339 and user interface 352 may be used to determine set of assigned frequencies 345.

In one embodiment, frequency detection module 339 may also detect frequency 361 used by device 336. In this embodiment, device 336 may transmit or receive data using frequency 361. Device 336 may be any device capable of emitting radiation having a frequency, including any of the devices described herein. For example, device 336 may be a wireless or cordless device, such as a wireless phone or wireless router. In one embodiment, detecting frequency 361 may include receiving a request from device 336 to use frequency 361. In another embodiment, frequency 361 may also be indicated by user input 355 via user interface 352.

Frequency management system 325 also includes interference determination engine 364. In one embodiment, interference determination engine 364 determines whether frequency 361 interferes with an assigned frequency in set of assigned frequencies 345. For example, interference determination engine 364 may determine whether frequency 361 equals an assigned frequency in set of assigned frequencies 345. In another example, interference determination engine 364 may determine whether frequency 361 adversely affects the operation of any device in set of devices 333.

In another embodiment, interference determination engine 364 may determine whether frequency 361 interferes with an assigned frequency in set of assigned frequencies 345 based on a set of factors. The set of factors includes one or more factors. Non-limiting examples of factors that may be included in the set of factors are a device range, a device signal strength, a device priority, a device location, a device type, a device operational requirement, device ownership, available bandwidth, and structural surrounding.

The device range is the maximum distance at which a device can emit radiation and still be operational. For example, a wireless phone may have a device range beyond which the cordless phone can no longer properly communicate with the wireless phone base. The device range may be used by interference determination engine 364 in a variety of ways to determine interference. In one embodiment, when a device in set of devices 333 is out of that device's range, the frequency for that may not be considered by interference determination engine 364 when determining whether interference exists with frequency 361.

The device signal strength is the strength of the signal that is being transmitted or received by a device. In one embodiment, when a device in set of devices 333 has a device signal strength that is below a threshold or operational strength, the frequency for that may not be considered by interference determination engine 364 when determining whether interference exists with frequency 361. The device location is the location of the device. In one embodiment, the location of device 336 may be considered in determining whether device 336 interferes with any of set of devices 333; in this embodiment, interference determination engine 364 may determine that the location of device 336 is too far to interfere with a particular device in set of devices 333 that has a same or potentially interfering frequency.

The device type indicates the type of any or all of the set of devices 333 and device 336, such as wireless phone, microwave, wireless router, or any other device that emits radiation. The device operational requirement is any requirement of the device that is needed or preferred for the device to be operational. The device ownership indicates an owner of the device. The available bandwidth indicates the available bandwidth in the frequency range for which frequency management system 325 is managing frequencies. For example, the available bandwidth may indicate the available frequencies in a licensed or unlicensed frequency range. The structural surrounding indicates the structure in the area of the transmission environment in which frequency management system 325 is managing frequencies. For example, the structural surrounding may be a home, office, or any other structure. The home may be a condominium, house, or any other type of residential dwelling.

In one embodiment, interference determination engine 364 may identify an unassigned frequency for use by device 336 in response to determining whether frequency 361 interferes with an assigned frequency in set of assigned frequencies 345. In one example, the unassigned frequency is not included in set of assigned frequencies 345 when interference determination engine 364 identifies the unassigned frequency. Interference determination engine 364 may query or otherwise reference assigned frequency database 348 in determining whether frequency 361 interferes with an assigned frequency in set of assigned frequencies 345.

Interference determination engine 364 may use any of the aforementioned factors to identify an unassigned frequency for use by device 336. In particular, interference determination engine 364 may identify an unassigned frequency for use by device 336 based on a device range, a device signal strength, a device priority, a device location, a device type, a device operational requirement, device ownership, available bandwidth, and structural surrounding.

The device priority is a priority that may be given to any of set of devices 333 or device 336. For example, any of these devices may be associated with a priority that ranges from high priority to low priority. Devices may be associated with a priority in the priority range based on the device's importance. For example, a wireless phone or wireless router may be assigned to be high priority devices; either of these two devices may also be assigned to have a higher priority than the other. In one embodiment, the priority range includes increments within the range, such as a scale from 1 to 10, or the levels of "low priority," "medium priority," and "high priority." In one embodiment, the device priority for a device may be based on the device type factor and/or the device operational requirement factor described above. The device priority for any or all of the set of devices 333 and device 336 may be defined by user 358, such as via user input 355. In another embodiment, a device priority may be programmed into any or all of the set of devices 333 and device 336.

In one embodiment, interference determination engine 364 identifies an unassigned frequency in an unlicensed frequency band in response to determining that frequency 361 interferes with set of assigned frequencies 345. In this embodiment, the unassigned frequency is different from frequency 361. In one embodiment, the available bandwidth may be limited such that not all devices may be able to use assigned frequencies that do not interfere with one another; in this case, interference determination engine 364 may identify a frequency for use by device 336 if device 336 has a higher priority than the device with which device 336 interferes. On the other hand, interference determination engine 364 may decline to identify a frequency for use by device 336 if device 336 has a lower priority than the device with which device 336 interferes; in this case, the device with which device 336 interferes may be allowed to continue using the frequency that interferes with frequency 361. Open frequency signaling module 367 may also signal device 336 to use the unassigned frequency. In one embodiment, open frequency signaling module 367 may determine whether to signal the device 336 to use the unassigned frequency based on a set of factors, including at least one of a device range, a device signal strength, a device priority, a device location, a device type, a device operational requirement, device ownership, available bandwidth, and structural surrounding. For example, open frequency signaling module 367 may decline to send a frequency for use by device 336 if device 336 has a lower priority than the device with which device 336 interferes; in this case, the device with which device 336 interferes may be allowed to continue using the frequency that interferes with frequency 361. In another embodiment, open frequency signaling module 367 may send frequency data 370 to device 336. Frequency data 370 may include data that indicates the unassigned frequency to be used by device 336.

Frequency assignment module 342 may also add the unassigned frequency to set of assigned frequencies 345. For example, the unassigned frequency may be added to set of assigned frequencies 345 upon interference determination engine 364 identifying the unassigned frequency, or upon open frequency signaling module 367 signaling device 336 to use the unassigned frequency.

In another embodiment, interference determination engine 364 identifies the unassigned frequency to be frequency 361 in response to determining that frequency 361 does not interfere with set of assigned frequencies 345. In this embodiment, frequency management system 325 may allow device 336 to continue using frequency 361. In another embodiment, open frequency signaling module 367 may also signal device 336 to use the frequency 361. In this embodiment, open frequency signaling module 367 may send frequency data 370 to device 336, in which case frequency data 370 may include data that indicates frequency 361.

Frequency assignment module 342 may also add frequency 361 to set of assigned frequencies 345. For example, the frequency 361 may be added to set of assigned frequencies 345 upon interference determination engine 364 identifying frequency 361 to be an unassigned frequency, or upon open frequency signaling module 367 signaling device 336 to use frequency 361

In one embodiment, all or a portion of set of devices 333 and device 336 operate, or otherwise emit radiation, in an unlicensed frequency band. In this embodiment, set of assigned frequencies 345, the unassigned frequency, and/or frequency 361 may be in the unlicensed frequency band, such as an unlicensed frequency band having a range of 2.400 gigahertz to 2.500 gigahertz. By keeping track and assigning frequencies to be used by various devices, the illustrative embodiments may help to prevent interference caused by two or more devices using conflicting frequencies.

In one embodiment, device 336 may execute a method for communicating that is compatible with frequency management system 325. In this embodiment, device 336 may send data in a wireless medium using frequency 361. Device 336 may also receive a signal, such as frequency data 370, which indicates a particular frequency that is unassigned for use by another device in set of devices 333. In one embodiment, device 336 includes a device interface to which frequency data 370 is delivered. Frequency data 370 may include instructions, such as programming code, that cause device 336 to use a particular frequency. The device interface may contain a programming interface that allows device 336 to recognize the instructions in frequency data 370. Device 336 may send data using the particular frequency in response to receiving the signal. In one embodiment, the particular frequency is the same as frequency 361. In another embodiment, the particular frequency is different from frequency 361.

Figure 4:
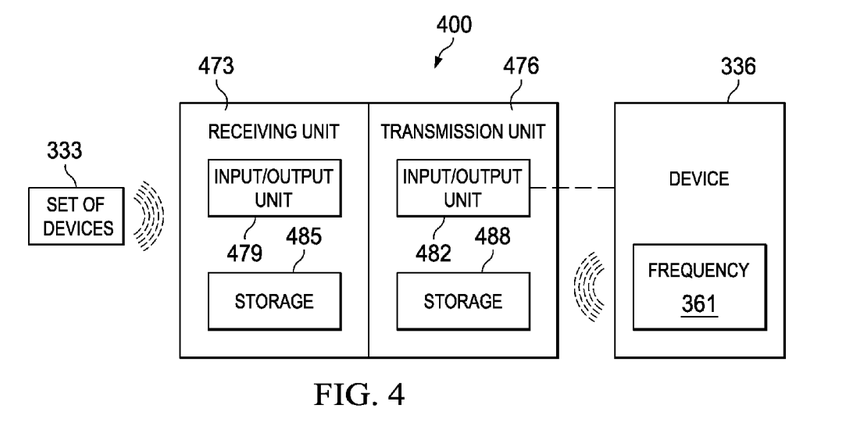
FIG. 4 is a schematic block diagram of a data processing system in which the illustrative embodiments of the present invention may be implemented.

Turning now to FIG. 4, a data processing system 400 for managing frequencies used by devices is shown according to an illustrative embodiment. Data processing system 400 is a non-limiting example of data processing system 200 in FIG. 2 on which frequency management system 125 or 325 in FIGS. 1 and 3 may be implemented.

Data processing system 400 includes receiving unit 473 and transmission unit 476. Receiving unit 473 includes input/output unit 479 and transmission unit 476 includes input/output unit 482. The inclusion of input/output units 479 and 482 is a non-limiting example of the inclusion of input/output unit 212 in data processing system 200 in FIG. 2. Also, receiving unit 473 includes storage 485 and transmission unit 476 includes storage 488. The inclusion of storages 485 and 488 is a non-limiting example of the inclusion of memory 206 and/or persistent storage 208 in FIG. 2.

In one embodiment, input/output unit 479 detects a set of frequencies being used by set of devices 333 to form a set of assigned frequencies, such as set of assigned frequencies 345 in FIG. 3. Storage 485 may store the set of assigned frequencies. In one embodiment, storage 485 stores the set of assigned frequencies in response to input/output unit 479 detecting the set of frequencies being used by set of devices 333 to form a set of assigned frequencies. Input/output unit 479 may also detect frequency 361 from device 336. In one embodiment, either or both of input/output units 479 and 482 may include a user interface, such as user interface 352 in FIG. 3, that is operable to receive user input, such as user input 355 in FIG. 3, indicating a set of frequencies being used by set of devices 333 to form the set of assigned frequencies.

In one embodiment, data processing system 400 also includes a processing unit (not shown), such as processor unit 204 in FIG. 2. In one embodiment, the processing unit executes a set of instructions to identify an unassigned frequency in an unlicensed frequency band in response to determining that frequency 361 from device 336 interferes with the set of assigned frequencies, which may be from set of devices 333. In this embodiment, the unassigned frequency is different from frequency 361. Input/output unit 482 may also signal device 336 to use the unassigned frequency. Storage 488 may store the unassigned frequency that is signaled to device 336. The processing unit may also execute of instructions to add the unassigned frequency to the set of assigned frequencies stored in storage 485.

In another embodiment, the processing unit executes a set of instructions to identify the unassigned frequency to be frequency 361 in response to determining that frequency 361 does not interfere with the set of assigned frequencies. In this embodiment, storage 485 may store the set of assigned frequencies. Also, storage 488 may store frequency 361. The processing unit may also execute a set of instructions to add frequency 361 to the set of assigned frequencies stored in storage 485. In another embodiment, input/output unit 482 may signal device 336 to use frequency 361.

Figure 5:
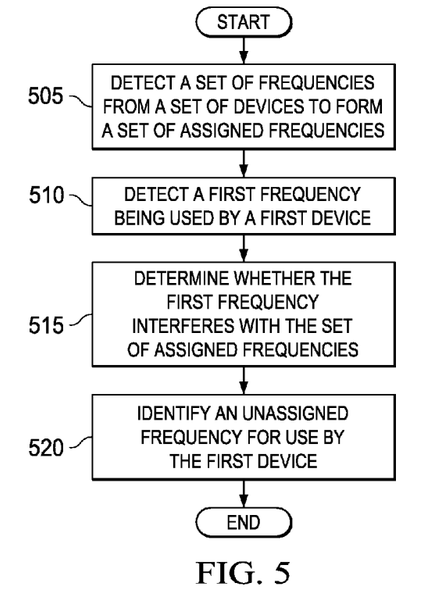
FIG. 5 is a flowchart illustrating a process for managing frequencies used by devices in accordance with an illustrative embodiment.

Turning now to FIG. 5, a flowchart illustrating a process for managing frequencies used by devices is depicted in accordance with an illustrative embodiment. In one embodiment, the process shown in FIG. 5 may be implemented by a frequency management system, such as frequency management system 125 in FIG. 1 or frequency management system 325 in FIG. 3.

The process begins by detecting a set of frequencies from a set of devices to form a set of assigned frequencies (step 505). The process also detects a first frequency being used by a first device (step 510). The use of the term "first" does not express or imply any temporal or other limitations on the frequency or device, but is used only for identification purposes. The process determines whether the first frequency interferes with the set of assigned frequencies (step 515). The process identifies an unassigned frequency for use by the first device (step 520).

Figure 6A:
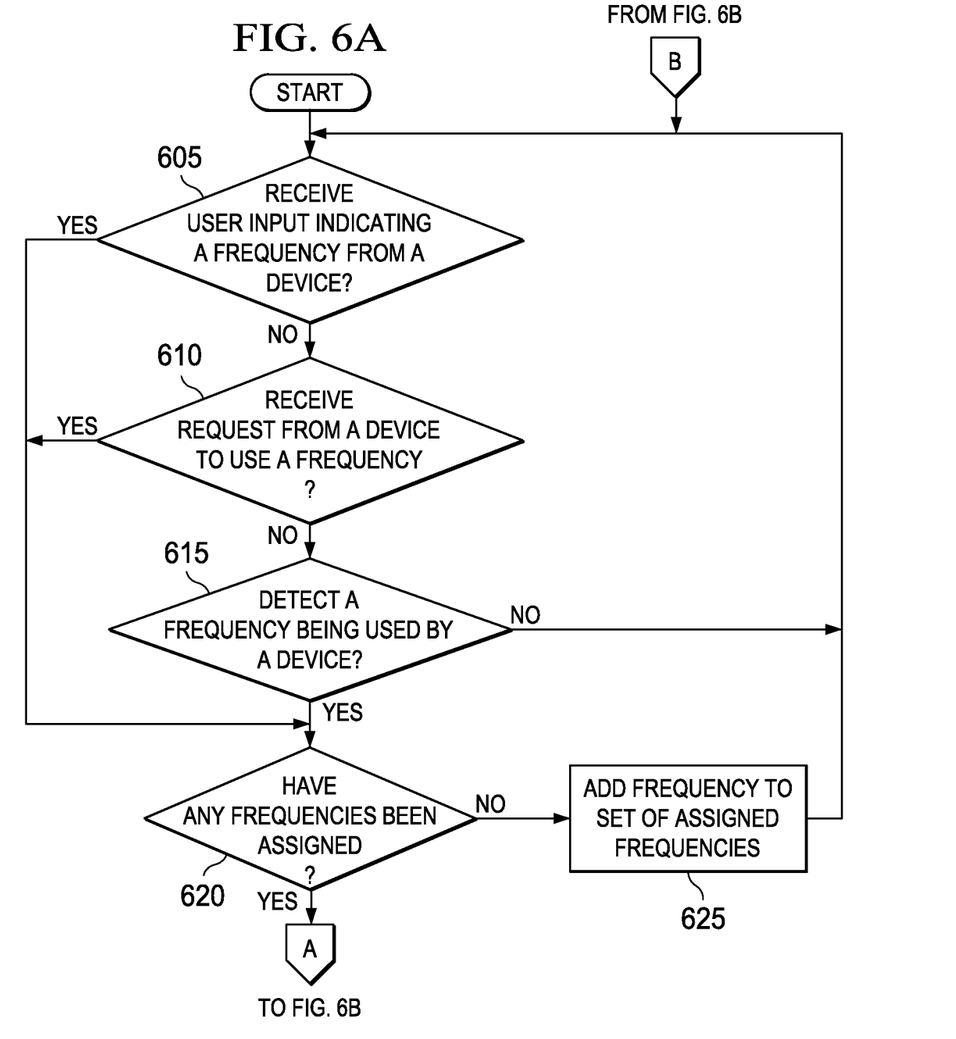
FIGS. 6A and 6B illustrate a flowchart for a process for managing frequencies used by devices in accordance with an illustrative embodiment.
Figure 6B:
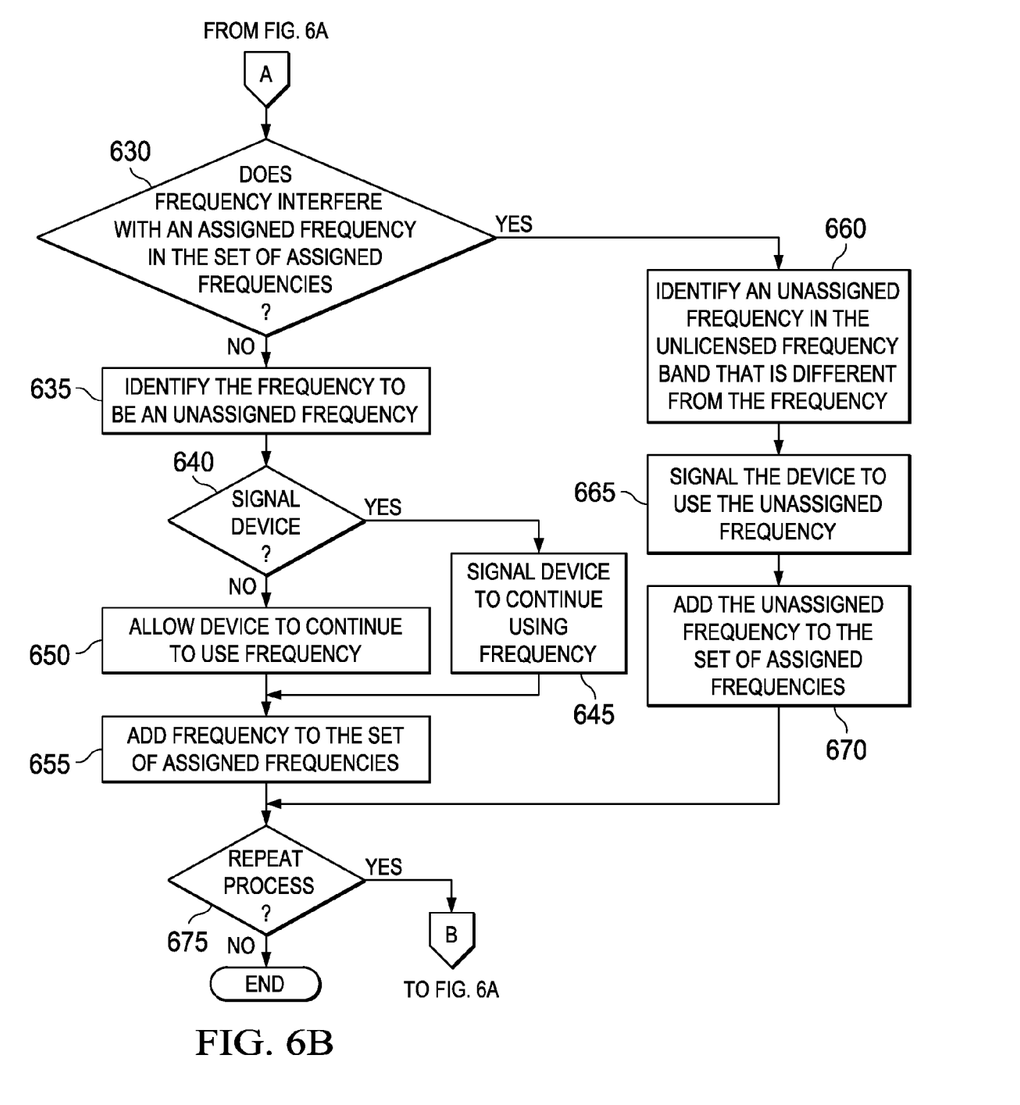

Turning now to FIGS. 6A and 6B, a flowchart illustrating a process for managing frequencies used by devices is depicted in accordance with an illustrative embodiment. In one embodiment, the process shown in FIG. 6 may be implemented by a frequency management system, such as frequency management system 125 in FIG. 1 or frequency management system 325 in FIG. 3.

The process begins by determining whether user input indicating a frequency from a device is received (step 605). If the process determines that user input indicating a frequency from a device is received, the process proceeds to step 620. Returning to step 605, if the process determines that user input indicating a frequency from a device is not received, the process determines whether a request from a device to use a frequency is received (step 610). If the process determines that a request from a device to use a frequency is received, the process proceeds to step 620.

Returning to step 610, if the process determines that a request from a device to use a frequency is not received, the process determines whether a frequency being used or otherwise emitted from a device is detected (step 615). If the process determines that a frequency being used or otherwise emitted from a device is not detected, the process returns to step 605. If the process determines that a frequency being used or otherwise emitted from a device is detected, the process determines whether any frequencies have been assigned (step 620). If the process determines that no frequencies have been assigned, the process adds the frequency to the set of assigned frequencies (step 625). The process then returns to step 605.

Returning to step 620, if the process determines that at least one frequency has been assigned to the set of assigned frequencies, the process determines whether the frequency from any one of steps 605, 610, or 615 interferes with an assigned frequency in the set of assigned frequencies (step 630). If the process determines that the frequency does not interfere with an assigned frequency in the set of assigned frequencies, the process identifies the frequency to be an unassigned frequency (step 635). The process also determines whether to signal the device (step 640). If the process determines to signal the device, the process signals the device to continue using the frequency (step 645). The process then proceeds to step 655.

Returning to step 640, if the process determines not to signal the device, the process allows the device to continue to use the frequency (step 650). The process also adds the frequency to the set of assigned frequencies (step 655).

Returning to step 630, if the process determines that the frequency does interfere with an assigned frequency in the set of assigned frequencies, the process identifies an unassigned frequency in an unlicensed frequency band that is different from the frequency (step 660). The process also signals the device to use the unassigned frequency (step 665). The process adds the unassigned frequency to the set of assigned frequencies (step 670).

The process determines whether to repeat the process (step 675). If the process determines to repeat the process, the process returns to step 605. If the process determines not to repeat the process, the process may terminate.

Figure 7:
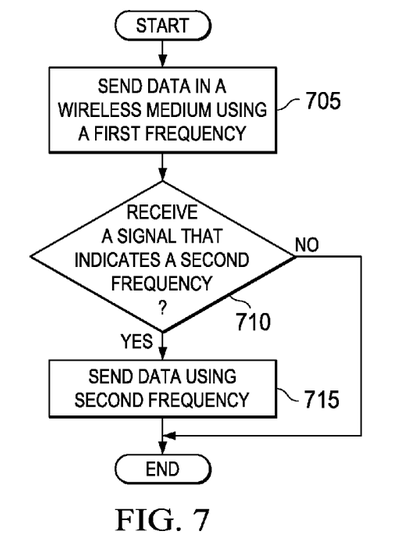
FIG. 7 is a flowchart illustrating a process for communicating using a communication device that is compatible with a frequency management system in accordance with an illustrative embodiment.

Turning now to FIG. 7, a flowchart illustrating a process for communicating using a communication device that is compatible with a frequency management system is depicted in accordance with an illustrative embodiment. In one embodiment, the process shown in FIG. 7 may be implemented by a device, such as any of the devices in FIG. 1, 3, or 4.

The process begins by sending data in a wireless medium using a first frequency (step 705). The process determines whether a signal that indicates a second frequency is received (step 710). The second frequency may be the same as or different from the first frequency. If the process determines that a signal that indicates a second frequency is not received, the process may terminate. If the process determines that a signal that indicates a second frequency is received, the process sends data using the second frequency (step 715). The process may then terminate.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

The principles of the present invention can take the form of an entirely hardware embodiment, an entirely software embodiment or an embodiment containing both hardware and software elements. In one embodiment, the invention is implemented in software, which includes but is not limited to firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code may include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, and pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for managing frequencies used by devices, the method comprising:
   detecting a set of frequencies from a set of devices to form a set of assigned frequencies;
   detecting a first frequency used by a first device in a transmission area;
   determining whether the first frequency interferes with an assigned frequency in the set of assigned frequencies; and
   responsive to determining whether the first frequency interferes with the set of assigned frequencies, identifying an unassigned frequency for use by the first device, based on a set of factors including a type of structural surrounding of the transmission area.

2. The method of claim 1, further comprising:
   responsive to determining that the first frequency interferes with the set of assigned frequencies, identifying the unassigned frequency in an unlicensed frequency band, wherein the unassigned frequency is different from the first frequency; and
   signaling the first device to use the unassigned frequency.

3. The method of claim 2, further comprising:
   adding the unassigned frequency to the set of assigned frequencies.

4. The method of claim 1, further comprising:
   responsive to determining that the first frequency does not interfere with the set of assigned frequencies, identifying the unassigned frequency to be the first frequency.

5. The method of claim 4, further comprising:
   adding the first frequency to the set of assigned frequencies.

6. The method of claim 5, further comprising:
signaling the first device to use the first frequency.

7. The method of claim 1, wherein the first frequency, the unassigned frequency, and the set of assigned frequencies are within an unlicensed frequency band.

8. The method of claim 7, wherein the unlicensed frequency band has a range of 2.400 gigahertz to 2.500 gigahertz.

9. The method of claim 1, wherein detecting the first frequency used by the first device includes receiving a request from the first device to use the first frequency.

10. The method of claim 1, wherein detecting the set of frequencies being used by the set of devices to form the set of assigned frequencies includes receiving, via a user interface, user input indicating the set of frequencies being used by the set of devices to form the set of assigned frequencies.

11. The method of claim 10, wherein the user input indicates a particular device that uses at least one of the set of assigned frequencies.

12. The method of claim 1, wherein the set of assigned frequencies is in use by the set of devices, wherein each of the set of devices uses a respective assigned frequency in the set of assigned frequencies.

13. The method of claim 1, wherein determining whether the first frequency interferes with the set of assigned frequencies includes determining whether the first frequency equals one of the set of assigned frequencies.

14. The method of claim 1, further comprising:
storing the set of assigned frequencies in a first storage in response to detecting the set of frequencies being used by the set of devices to form the set of assigned frequencies.

15. The method of claim 14, further comprising:
storing the unassigned frequency in a second storage.

16. The method of claim 1, wherein determining whether the first frequency interferes with the assigned frequency in the set of assigned frequencies includes determining whether the first frequency interferes with the assigned frequency in the set of assigned frequencies based on a second set of factors, and wherein the second set of factors include at least one of a device range, a device signal strength, a device priority, a device location, a device type, a device operational requirement, device ownership, available bandwidth, and structural surrounding.

17. The method of claim 16, wherein the device priority is programmed in at least one of the first device and a device in the set of devices.

18. The method of claim 16, wherein the device priority is user-defined for at least one of the first device and a device in the set of devices.

19. The method of claim 16, wherein the device priority is based on at least one of the device types and the device operational requirement.

20. The method of claim 16, wherein the structural surroundings is one of a home or an office.

21. The method of claim 20, wherein the home is one of a condominium or a house.

22. The method of claim 1, wherein the set of factors further includes at least one of a device range, a device signal strength, a device priority, a device location, a device type, a device operational requirement, device ownership, and available bandwidth.

23. An apparatus for managing frequencies used by devices, the apparatus comprising:
a bus system;
an input/output unit connected to the bus system, the input/output unit detecting a set of frequencies being used by a set of devices to form a set of assigned frequencies and detecting a first frequency used by a first device in a transmission area;
a memory connected to the bus system, wherein the memory includes a set of instructions;
a processing unit connected to the bus system, wherein the processing unit executes the set of instructions to: determine whether the first frequency interferes with the set of assigned frequencies and identify an unassigned frequency for use by the first device in response to determining whether the first frequency interferes with the set of assigned frequencies and based on a set of factors including a type of structural surrounding of the transmission area.

24. The apparatus of claim 23, wherein the processing unit further executes the set of instructions to identify the unassigned frequency in an unlicensed frequency band in response to determining that the first frequency interferes with the set of assigned frequencies, wherein the unassigned frequency is different from the first frequency, and wherein the input/output unit signals the first device to use the unassigned frequency.

25. The apparatus of claim 24, wherein the input/output unit comprises a first input/output unit in a receiving unit and a second input/output unit in a transmission unit, wherein the first input/output unit detects the set of frequencies being used by the set of devices to form the set of assigned frequencies and detects the first frequency used by the first device, and wherein the second input/output unit signals the first device to use the unassigned frequency.

26. The apparatus of claim 25, wherein the memory further comprises a first storage device in the receiving unit and a second storage device unit in the transmission unit, wherein the first storage device stores the set of assigned frequencies, and wherein the second storage device stores the unassigned frequency that is signaled to the first device, wherein the processing unit further executes the set of instructions to add the unassigned frequency to the set of assigned frequencies stored in the first storage device.

27. The apparatus of claim 23, wherein the processing unit further executes the set of instructions to identify the unassigned frequency to be the first frequency in response to determining that the first frequency does not interfere with the set of assigned frequencies.

28. The apparatus of claim 27, wherein the memory further comprises a first storage device in a receiving unit and a second storage device unit in a transmission unit, wherein the first storage device stores the set of assigned frequencies, and wherein the second storage device stores the first frequency, and wherein the processing unit further executes the set of instructions to add the first frequency to the set of assigned frequencies.

29. The apparatus of claim 28, wherein the input/output unit comprises a first input/output unit in a receiving unit and a second input/output unit in a transmission unit, wherein the first input/output unit detects the set of frequencies being used by the set of devices to form the set of assigned frequencies and detects the first frequency used by the first device, and wherein the second input/output unit signals the first device to use the first frequency.

30. The apparatus of claim 23, wherein the input/output unit further comprises: a user interface operable to receive user input indicating the set of frequencies being used by the set of devices to form the set of assigned frequencies.

31. A method for communicating using a communication device that is compatible with a frequency management system, the communication device comprising:

sending, with a device in a transmission area, data in a wireless medium using a first frequency;

receiving a signal that indicates a second frequency, the second frequency having been selected based on a set of factors including a type of structural surrounding of the transmission area; and responsive to receiving the signal, sending data using the second frequency, wherein the second frequency is unassigned for use by another device.

32. The method of claim 31, wherein the first frequency is the same as the second frequency.

33. The method of claim 31, wherein the first frequency is different from the second frequency.

34. The method of claim 31, wherein the wireless communication device is a cordless phone.

* * * * *